(12) United States Patent
Warrender et al.

(10) Patent No.: US 8,187,705 B2
(45) Date of Patent: May 29, 2012

(54) MANGANESE VANADIUM TANTALUM OXIDE AND PIGMENTS HAVING A BLACK METALLIC EFFECT COATED WITH THE SAME

(75) Inventors: Stewart Warrender, Fife (GB); Hai Hui Lin, Naperville, IL (US); Parfait Jean Marie Likibi, Mount Pleasant, SC (US); Rajasekar Pitchimani, Breinigsville, PA (US); Devidas Balu Raskar, Fife (GB); David Aldous, Fife (GB)

(73) Assignee: Silberline Manufacturing Company, Inc., Tamaqua, PA (US)

( * ) Notice: Subject to any disclaimer, the term of this patent is extended or adjusted under 35 U.S.C. 154(b) by 0 days.

(21) Appl. No.: 12/837,304

(22) Filed: Jul. 15, 2010

(65) Prior Publication Data

US 2012/0016058 A1    Jan. 19, 2012

(51) Int. Cl.
| | |
|---|---|
| *B32B 27/20* | (2006.01) |
| *B32B 1/00* | (2006.01) |
| *B32B 33/00* | (2006.01) |
| *B05D 1/36* | (2006.01) |
| *B05D 5/00* | (2006.01) |
| *C01G 31/02* | (2006.01) |
| *C01G 35/00* | (2006.01) |
| *C01G 45/00* | (2006.01) |
| *F21V 9/04* | (2006.01) |

(52) U.S. Cl. ........ 428/328; 428/325; 428/403; 428/404; 428/406; 427/217; 427/219; 423/599; 423/594.8; 252/587

(58) Field of Classification Search .................. 252/587; 423/599, 594.8, 605, 594.17; 427/214, 215, 427/217, 218, 219; 428/323, 325, 328, 402, 428/403, 404, 406
See application file for complete search history.

(56) References Cited

U.S. PATENT DOCUMENTS

| | | | | |
|---|---|---|---|---|
| 5,939,201 | A * | 8/1999 | Boire et al. | 428/432 |
| 7,501,208 | B2 * | 3/2009 | Feddrix et al. | 429/224 |
| 2003/0215712 | A1 * | 11/2003 | Feddrix et al. | 429/224 |
| 2007/0169815 | A1 * | 7/2007 | Kim et al. | 136/263 |
| 2007/0228340 | A1 | 10/2007 | Hayes et al. | |
| 2009/0104369 | A1 | 4/2009 | Rajala et al. | |

FOREIGN PATENT DOCUMENTS

| | | |
|---|---|---|
| EP | 1170258 | 1/2002 |
| JP | 2002-331611 | 11/2002 |
| KR | 1999-008413 | 1/1999 |
| KR | 10-2007-0076877 | 7/2007 |
| KR | 10-2009-0059342 | 6/2009 |
| WO | 2010-019674 | 2/2010 |

OTHER PUBLICATIONS

Machine translation of KR 10-2009-0059342 A, provided by the KIPO website (no date).*
A.K. Bendiganavale, and V.C. Malshe, "Infrared Reflective Inorganic Pigments," Recent Patents on Chemical Engineering (2008), vol. 1, p. 67-79.

* cited by examiner

*Primary Examiner* — Michael J Feely
(74) *Attorney, Agent, or Firm* — Hamre, Schumann, Mueller & Larson, P.C.

(57) ABSTRACT

Manganese vanadium tantalum oxide that can be represented by the formula $Mn_xV_yTa_zO_w$, where $1 \leq x \leq 3$, $0.001 \leq y \leq 3$, $0.001 \leq z \leq 2$, and $w=7$, and alternately, $x=1.25 \leq x \leq 2.45$, $0.1 \leq y \leq 2.39$, $0.2 \leq z \leq 1.9$, and $w=7$, methods of producing $Mn_xV_yTa_zO_w$, a pigment coated with $Mn_xV_yTa_zO_w$ and a chalcogenide glass layer, and a method of producing the coated pigment are described. The disclosed manganese vanadium tantalum oxide has superior near-infrared reflective properties. The disclosed methods of producing the manganese vanadium tantalum oxide provide products with superior phase purity, appearance and performance and take health and safety into consideration. The construction of the disclosed coated pigment combines the reflective properties of the substrate with the near-infrared reflective properties of $Mn_xV_yTa_zO_w$, while the chalcogenide glass layer provides aesthetic appeal. The disclosed method of producing the coated pigment involves physical vapor deposition of $Mn_xV_yTa_zO_w$ and the chalcogenide glass layer.

26 Claims, 5 Drawing Sheets

MANGANESE VANADIUM TANTALUM OXIDE AND PIGMENTS HAVING A BLACK METALLIC EFFECT COATED WITH THE SAME

FIELD

This disclosure relates generally to coated pigments and their coating materials, and particularly to the synthesis of a mixed metal oxide having infrared reflective properties and design of a coated pigment having a black metallic effect including the mixed metal oxide.

BACKGROUND

Pigments having high infrared reflectance are known. For example, manganese vanadium oxide pigments having the formula $Mn_xV_yO_z$, where $2x+2.5y \geqq z$ provide infrared reflectance and are formed by a solid state reaction. In this method, the starting materials are mixed and ground together to form a fine and homogenous dry mix. While the synthesis of these mixed metal oxides using the solid state reaction is standard for such solid state processing, improvements may be made upon not only the existing material, but also the method of manufacturing the material.

Black pigments are known. For example, black pigments have been formed using black iron oxide on a mica substrate. Such pigments provide black color, but have weak to no metallic appearance (if at all) and lack sufficient smoothness. Other types of black pigments have been reported, but do not achieve a metallic black color, for example due to scattering of light by carbon.

Currently, there are "cool black" pigments that comply with certain standards for Solar Reflectance. However, such "cool pigments" are typically dark brown in color, and are not true black pigments, i.e., the pigments do not give a black appearance when viewed at an angle. Furthermore, many of these products contain undesirable elements such as chromium.

SUMMARY

Manganese vanadium tantalum oxide represented by the formula $Mn_xV_yTa_zO_w$, methods of producing $Mn_xV_yTa_zO_w$, a pigment coated with $Mn_xV_yTa_zO_w$ and a chalcogenide glass layer, and a method of producing the coated pigment are described. The disclosed manganese vanadium tantalum oxide has superior near-infrared (IR) reflective properties. The methods of producing the manganese vanadium tantalum oxide provide products with superior phase purity, appearance and performance and take health and safety into consideration. The construction of the disclosed coated pigment combines the reflective properties of the substrate with the near-IR reflective properties of $Mn_xV_yTa_zO_w$, while the chalcogenide glass layer provides high visible absorption to give a dark appearance (e.g. black color effect) while giving high reflectivity at an angle (e.g. metallic effect). The disclosed method of producing the coated pigment involves physical vapor deposition of $Mn_xV_yTa_zO_w$ and the chalcogenide glass layer.

The disclosed manganese vanadium tantalum oxide alone or in combination with other materials, and the disclosed coated pigment can be used for heat management applications where a dark color finish is desired, including, but not limited to, automotives, architectural, plastics (e.g. agricultural), and inks (gravure, lithographic, flexo, letterpress), as well as security/authentication applications.

In one embodiment, the disclosed manganese vanadium tantalum oxide is represented by the formula $Mn_xV_yTa_zO_w$ where x has a value of 2, y has a value of 1, z has a value of 1, and w has a value of 7. In one example, the disclosed material exhibits near-IR reflection of up to about 90%, with a Solar Reflectance (SR) value of about 33%.

In one embodiment of the method of producing the disclosed material, a solid state reaction is utilized. In this approach, oxide powders of manganese, vanadium and tantalum are mixed and ground together to form a fine and homogenous dry mixture. In one example, the mixture is loaded into a crucible and then heated for a predetermined amount of time. In another example, the mixture is reacted in a rotating tube furnace at a predetermined temperature. The resulting product may be ground to a fine powder.

In another embodiment of the method of producing the disclosed material, a wet route is utilized. In one example of the wet route, an alkaline vanadium-containing solution and an acidic manganese-containing solution are combined to precipitate a vanadium-manganese precursor paste. A tantalum source is then blended with this paste and the whole mixture is treated at a predetermined temperature. In another example of the wet route, an alkaline vanadium-containing solution, acidic manganese-containing solution and a tantalum-containing solution are mixed to precipitate a vanadium-manganese-tantalum precursor paste that can be treated at a predetermined temperature. In one instance, the pH of the solutions can be adjusted further by the addition of acid or base as necessary. In one implementation, the wet route provides a way to avoid dusting hazards associated with the solid state reaction, and provides a more homogenous and intimately mixed starting mixture.

In yet another embodiment of the method of producing the disclosed material, a melt route is utilized. In this approach, oxide powders of manganese, vanadium and tantalum are heated to a temperature sufficient to melt the components and then are soaked for a time sufficient to allow full mixing of the melt. The melt is then poured and quenched after a predetermined amount of time. The resulting material is then ground and milled. In one implementation, the product produced by the melt route provides a dark color.

In one embodiment, the coated pigment includes a substrate coated with a $Mn_xV_yTa_zO_w$ layer and a chalcogenide glass layer. In one example, the chalcogenide glass layer is provided on the outer layer. In this example, the outer layer provides IR transparency and provides aesthetic properties. In one instance, the chalcogenide glass layer includes a Ge-based black chalcogenide glass system, which includes, but is not limited to, GeSbSe, GeSe, GeSeTe, GeSeSn, GeSeSnTe. In one implementation, the chalcogenide glass layer includes $Ge_{28}Sb_{12}Se_{60}$. In another instance, the chalcogenide glass layer includes a Si-based black chalcogenide glass system, which includes, but is not limited to, SiSbSe and SiSe. In yet another instance, the chalcogenide glass layer includes a Sn—Sb—Bi—Se like glass system.

In one embodiment of the method of producing the coated pigment, the $Mn_xV_yTa_zO_w$ layer and the chalcogenide glass layer are coated onto a substrate by physical vapor deposition (PVD).

DETAILED DESCRIPTION

Figure 1:
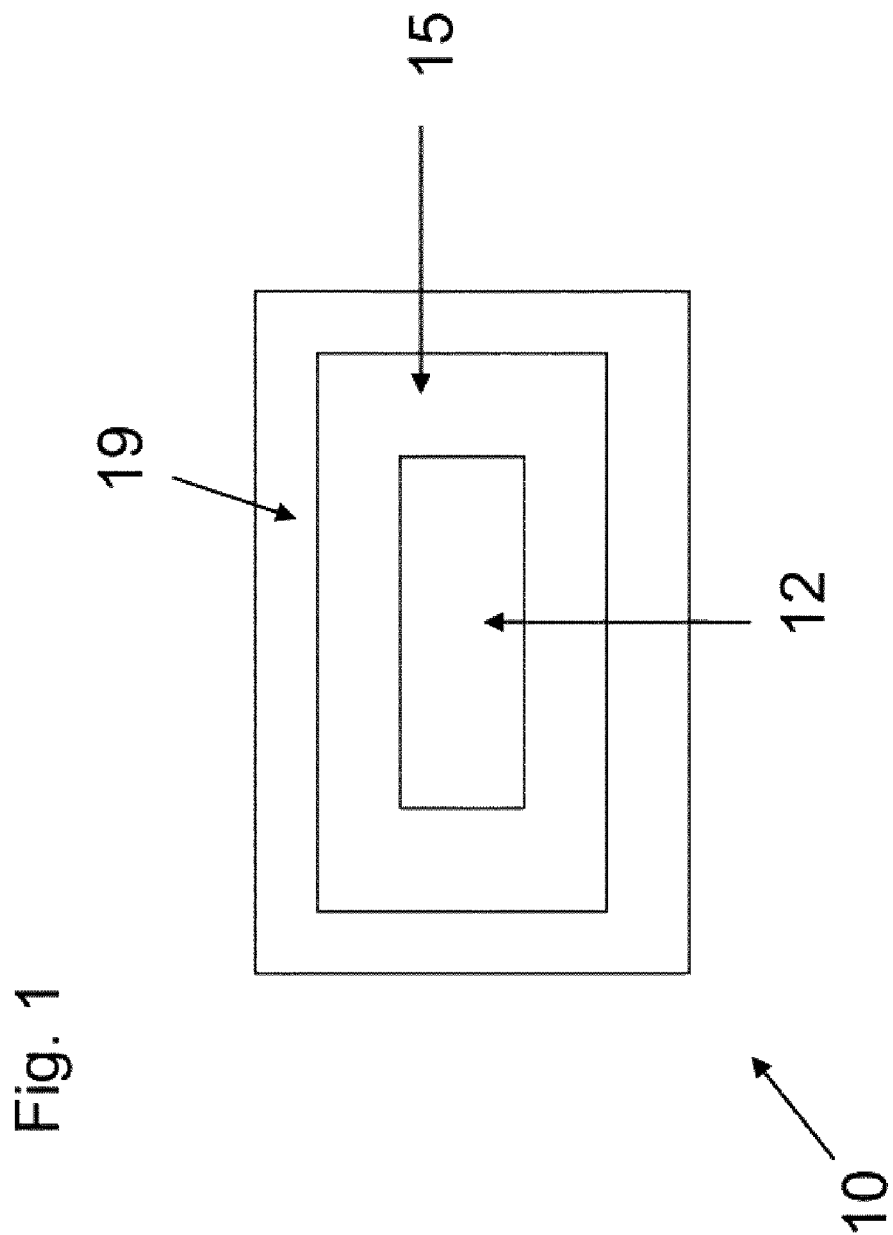
FIG. 1 shows a schematic side sectional view of one embodiment of the disclosed coated pigment.

Manganese vanadium tantalum oxide represented by the formula $Mn_xV_yTa_zO_w$, methods of producing $Mn_xV_yTa_zO_w$, a pigment coated with $Mn_xV_yTa_zO_w$, and a chalcogenide glass layer, and a method of producing the coated pigment are described. The disclosed manganese vanadium tantalum oxide has superior near-infrared (IR) reflective properties. This material is dark brown in color and is non-metallic in nature. The disclosed methods of producing the manganese vanadium tantalum oxide provide products with superior phase purity, appearance and performance and take health and safety into consideration. The construction of the disclosed coated pigment combines the reflective properties of the substrate with the near-IR reflective properties of $Mn_xV_yTa_zO_w$, while the chalcogenide glass layer provides aesthetic appeal. The disclosed method of producing the coated pigment involves physical vapor deposition of $Mn_xV_yTa_zO_w$ and the chalcogenide glass layer.

The disclosed coated pigment can be used for heat management applications where a dark color finish is desired, including, but not limited to, automotives, architectural, plastics (e.g. agricultural), and inks (gravure, lithographic, flexo, letterpress). The disclosed coated pigment also can be used for security/authentication applications, such as security markings for items such as credit cards, documents, packaging etc. In appropriate circumstances, it is to be realized that the concepts herein can be applied to other applications as well.

In one embodiment, the disclosed manganese vanadium tantalum oxide composition is represented by the formula $Mn_xV_yTa_zO_w$. In one example, $1 \leq x \leq 3$, $0.001 \leq y \leq 3$, $0.001 \leq z \leq 2$, and $w=7$, and alternately, $1.25 \leq x \leq 2.45$, $0.1 \leq y \leq 2.39$, $0.2 \leq z \leq 1.9$, and $w=7$. In another example, x is 2, y is 1, z is 1, and w is 7. In this formula, the oxidation state of Mn is 2+, the oxidation state of V is 5+ and the oxidation state of Ta is 5+. In another example, the formula can be varied from about $Mn_2V_{1.9}Ta_{0.1}O_7$ to about $Mn_2V_{0.1}Ta_{1.9}O_7$. In yet another example, the formula can be varied from about $Mn_2V_{1.7}Ta_{0.3}O_7$ to about $Mn_2V_{0.3}Ta_{1.7}O_7$. In yet another example, the formula can be varied from about $Mn_2V_{1.1}Ta_{0.9}O_7$ to about $Mn_2V_{0.9}Ta_{1.1}O_7$. In a further example, the composition can be varied from $Mn_{1.25}V_{2.39}Ta_{0.35}O_7$ to $Mn_{2.05}V_{0.79}Ta_{1.15}O_7$.

The disclosed composition possesses desirable near-IR reflective properties and has a Solar Reflectance (SR) of over 20% as stipulated by the California Air Resource Board (CARB) and Lawrence Berkeley National Labs (LBNL). In one instance, the disclosed composition exhibits near-IR reflectance of up to about 90% and has an SR of about 33%. The term "near-IR reflectance" means the reflectance properties of a composition at wavelengths between about 700 nm and 2500 nm.

In one embodiment of the method of producing the disclosed material, a solid state reaction is utilized. In this approach, manganese oxide, vanadium oxide and tantalum oxide or precursors capable of forming manganese oxide, vanadium oxide and tantalum oxide are mixed and ground together to form a fine and homogenous dry mix. In one instance, the manganese oxide, vanadium oxide and tantalum oxide used are $MnO_2$, $V_2O_5$ and $Ta_2O_5$, respectively. The precursors can be any precursors that are suitable for forming manganese vanadium tantalum oxide, including, but not limited to, MnO, $NH_4VO_3$, $VCl_x$, $NaVO_3$, etc. In one example, the manganese oxide, vanadium oxide and tantalum oxide or their precursors are in powder form. The amounts of the manganese oxide, vanadium oxide and tantalum oxide or their precursors utilized are such that they give a predetermined elemental ratio of manganese to vanadium to tantalum (Mn:V:Ta) in the mixture. The predetermined elemental ratio of Mn:V:Ta is set to yield optimum SR performance and a dark color. The predetermined elemental ratio of Mn:V:Ta is selected to satisfy valance and stoichiometric requirements to give stoichiometries as found within a triangular composition plot whose apices are defined as 100% Mn oxide, 100% V oxide and 100% Ta oxide. In one example the predetermined ratio of Mn:V:Ta can be from about 2:19:0.1 to about 2:0.1:19. In another example, the predetermined elemental ratio of Mn:V:Ta can be from 6.7:5.7:1 to 6.7:1:5.7. In yet another example, the predetermined elemental ratio of Mn:V:Ta can be from 2.2:1.2:1 to 2.2:1:1.2.

In one example, the mixture is loaded into a crucible and then heated for a predetermined amount of time. The temperatures at which the mixed powders are heated can be from about 800 to about 1100° C. In one instance, the mixed powders are heated from about 900 to 1050° C. In another instance, the mixed powders are heated from about 980 to 1020° C. Heating times can be longer than 30 minutes. In another example, the mixture is reacted in a rotating tube furnace at a predetermined temperature for a predetermined amount of time. In this instance, the temperatures at which the mixed powders are heated can be from about 800 to about 1100° C. In one instance, the mixed powders are heated from about 900 to 1050° C. In another instance, the mixed powders are heated from about 980 to 1020° C. Heating times can be longer than 30 minutes. The resulting product may then be ground to a fine powder. The fine powder can have an average particle size from about 0.1 μm to about 20 μm. In another example, the fine powder can have an average particle size from about 0.3 μm to about 10 μm. In another example, the fine powder can have an average particle size from about 0.5 μm to about 1.5 μm.

In one exemplary embodiment of the solid state reaction approach, manganese oxide, vanadium oxide and tantalum oxide powders are mixed to give a predetermined elemental ratio of Mn:V:Ta. In one implementation, the predetermined elemental ratio of Mn:V:Ta is 2:1:1. The mixture is ground until homogenous and loaded onto a crucible. The mixture is then heated to 1000° C. for four hours. After cooling, the product is removed and ground to a fine powder.

In one embodiment of the manganese vanadium tantalum oxide composition produced by the disclosed process using the solid state reaction, the manganese vanadium tantalum oxide composition has a formula that can be varied from about $Mn_2V_{1.9}Ta_{0.1}O_7$ to about $Mn_2V_{0.1}Ta_{1.9}O_7$. In yet another example, the formula can be varied from about $Mn_2V_{1.7}Ta_{0.3}O_7$ to about $Mn_2V_{0.3}Ta_{1.7}O_7$. In yet another example, the formula can be varied from about $Mn_2V_{1.1}Ta_{0.9}O_7$ to about $Mn_2V_{0.9}Ta_{1.1}O_7$.

In another embodiment of the method of producing the disclosed material, a wet route is utilized. In one example of the wet route, an alkaline vanadium-containing solution and an acidic manganese-containing solution are combined to precipitate a vanadium-manganese precursor paste. The solvent utilized for the alkaline vanadium-containing solution can be any solvent suitable for producing an alkaline solution, including, but not limited to, aqueous sodium hydroxide. The solvent utilized for the acidic manganese-containing solution can be any solvent suitable for producing an acidic solution, including, but not limited to, water. In one instance, the pH of the solutions can be adjusted further by the addition of an acid or a base. The alkaline vanadium-containing solution can have a pH between about 8 to about 14. In another example, the alkaline vanadium-containing solution can have a pH between 9 to 12. The acidic manganese-containing solution can have a pH between about 0 to about 6. In another example, the acidic manganese-containing solution can have a pH between 2 to 4. A tantalum source is then blended with this paste and the whole mixture is treated at a predetermined temperature. The amounts of the vanadium, manganese and tantalum utilized are such that they give a predetermined elemental ratio of Mn:V:Ta in the mixture. The predetermined elemental ratio of Mn:V:Ta is set to yield optimum SR performance and a dark color. The predetermined elemental ratio of Mn:V:Ta is selected to satisfy valance and stoichiometric requirements to give stoichiometries as found within the triangular composition plot whose apices are defined as 100% Mn oxide, 100% V oxide and 100% Ta oxide. In one example, the predetermined ratio of Mn:V:Ta can be from about 20:19:1 to about 20:1:19. In another example, the predetermined elemental ratio of Mn:V:Ta can be from about 6.7:5.7:1 to 6.7:1:5.7. In yet another example, the predetermined elemental ration of Mn:V:Ta can be from about 2.2:1.2:1 to about 2.2:1:1.2. The temperatures at which the mixture is heated can be from about 800 to about 1100° C. In one instance, the mixture is heated from about 900 to 1050° C. In another instance, the mixture is heated from about 980 to 1020° C. Heating times can be longer than 30 minutes.

In another example of the wet route, an alkaline vanadium-containing solution, an acidic manganese-containing solution and a tantalum-containing solution are mixed to precipitate a vanadium-manganese-tantalum precursor paste that can be treated at a predetermined temperature. The solvent utilized for the alkaline vanadium-containing solution can be any solvent suitable for producing an alkaline solution, including, but not limited to, aqueous sodium hydroxide. The solvent utilized for the acidic manganese-containing solution can be any solvent suitable for producing an acidic solution, including, but not limited to, water. In one instance, the pH of the solutions can be adjusted further by the addition of an acid or a base. The alkaline vanadium-containing solution can have a pH between about 8 to about 14. In another example, the alkaline vanadium-containing solution can have a pH between 9 to 10. The acidic manganese-containing solution can have a pH between about 0 to about 6. In another example, the acidic manganese-containing solution can have a pH between 2 to 4. The solvent utilized for the tantalum-containing solution can be, but not limited to anhydrous ethanol. The amounts of the vanadium, manganese and tantalum utilized are such that they give a predetermined elemental ratio of Mn:V:Ta in the mixture. The predetermined elemental ratio of Mn:V:Ta can be from about 2:1.9:0.1 to about 2:0.1:1.9. In another example, the predetermined elemental ratio of Mn:V:Ta can be from about 2:1.7:0.3 to about 2:0.3:1.7. In yet another example, the predetermined elemental ratio of Mn:V:Ta can be from about 2:1.1:0.9 to about 2:0.9:1.1. The temperatures at which the mixture is heated can be from about 800 to about 1100° C. In one instance, the mixture is heated from about 900 to 1050° C. In another instance, the mixture is heated from about 980 to 1020° C. Heating times can be longer than 30 minutes.

In one exemplary embodiment, manganese chloride is dissolved in water to form an acidic solution. Ammonium vanadate is dissolved in 1M sodium hydroxide solution. These solutions are added together to precipitate a Mn—V precursor. After concentrating the solution by evaporation, tantalum oxide is blended into the paste. The amounts of manganese chloride, ammonium vanadate and tantalum oxide, as well as the solutions utilized can be determined from a predetermined elemental ratio of Mn:V:Ta in the paste mixture. In one implementation, the predetermined elemental ratio of Mn:V:Ta in the paste mixture is set between about 2:1.9:0.1 to about 2:0.1:1.9. In another implementation, the predetermined elemental ratio of Mn:V:Ta in the paste mixture is set between about 2:1.7:0.3 to about 2:0.3:1.7. In yet another implementation, the predetermined elemental ratio of Mn:V:Ta in the paste mixture is set between about 2:1.1:0.9 to about 2:0.9:1.1. In one instance, the ratio is set to 2:1:1.

In one implementation, the wet route provides a way to avoid dusting hazards associated with the solid state reaction, and provides a more homogenous and intimately mixed starting mixture.

In one embodiment of the manganese vanadium tantalum oxide composition produced by the disclosed process using the wet route, the manganese vanadium tantalum oxide composition has a formula that can be varied from about $Mn_2V_{1.9}Ta_{0.1}O_7$ to about $Mn_2V_{0.1}Ta_{1.9}O_7$. In yet another example, the formula can be varied from about $Mn_2V_{1.7}Ta_{0.3}O_7$ to about $Mn_2V_{0.3}Ta_{1.7}O_7$. In yet another example, the formula can be varied from about $Mn_2V_{1.1}Ta_{0.9}O_7$ to about $Mn_2V_{0.9}Ta_{1.1}O_7$.

In yet another embodiment of the method of producing the disclosed material, a melt route is utilized. In this approach, manganese oxide, vanadium oxide and tantalum oxide or precursors capable of forming manganese oxide, vanadium oxide and tantalum oxide are heated to a temperature sufficient to melt the components and then are soaked for a time sufficient to allow full mixing of the melt. The temperatures at which the mixture is melted can be greater than 1000° C. In another example, the temperatures at which the mixture is melted can be between 1150° C. and 1450° C. In yet another example, the temperatures at which the mixture is melted can be between 1100° C. and 1250° C. Heating times depend on the type of furnace employed, but can be from about 1 hour to about 10 hours. Soaking times can be from about a few minutes to several hours depending on the scale. The melt is then poured and quenched, after a predetermined amount of time, onto a metal plate or into a water bath/water chute, or through a two-roll mill, or quenched using any other means suitable. The resulting material is then ground and milled.

In one instance, the manganese oxide, vanadium oxide and tantalum oxide used is $MnO_2$, $V_2O_5$ and $Ta_2O_5$, respectively. The precursors can be any precursors that are suitable for forming manganese vanadium tantalum oxide, including, but not limited to, MnO, $NH_4VO_3$, $VCl_x$, $NaVO_3$, etc. In some examples, the manganese oxide, vanadium oxide and tantalum oxide or their precursors are powders, granules, or pellets. The powders can have an average particle size from about 0.1 μm to about 10 μm. The granules can have an average particle size from about 10 μm to about 2000 μm. The pellets can have an average particle size greater than 2000 μm. The amounts of the manganese oxide, vanadium oxide and tantalum oxide or their precursors utilized are such that they give a predetermined elemental ratio of Mn:V:Ta in the mixture. The predetermined elemental ratio of Mn:V:Ta can take any values such that the composition of the product lies within a triangular composition map whose apices are defined to represent 100% Mn oxide, 100% V oxide and 100% Ta oxide. In one example the elemental ratio is selected to yield product compositions of the form $Mn_xV_yTa_zO_7$ where $1 \leq x \leq 3$, $0.001 \leq y \leq 3$, $0.001 \leq z \leq 2$, and $w=7$, and alternately, $1.25 \leq x \leq 2.05$, $0.79 \leq y \leq 2.39$ and $0.35 \leq z \leq 1.15$. In one example, the predetermined elemental ratio of Mn:V:Ta is 1.29:1:0.22, giving a product composition of $Mn_{2.05}V_{1.59}Ta_{0.35}O_7$.

The melt is then poured and quenched after a predetermined amount of time. The resulting material is then ground and milled.

In one exemplary embodiment of the melt route approach, manganese oxide, vanadium oxide and tantalum oxide powders/granules/pellets are mixed to give a predetermined elemental ratio of Mn:V:Ta in the mixture. In one implementation, the predetermined elemental ratio of Mn:V:Ta is 2:1:1. In another implementation, the predetermined elemental ratio of Mn:V:Ta is 1.29:1:0.22. The oxide powders/granules/pellets are lightly mixed without grinding. The mixture is then loaded into a crucible and heated at 1400° C. for 15 minutes. Thereafter, the melt is poured from the crucible and quenched onto a metal plate or into a water bath/water chute. The solidified melt is then ground and milled.

In another example of the melt route, the mixture is prepared as above except that after the mixture is loaded into a crucible, the mixture is heated to 1100° C. for 5 min and then quenched onto a metal plate or into water.

In the above methods of producing the disclosed material, a mineralizer can be added to the mixture. The mineralizer used can be, but not limited to, boric acid.

One embodiment of the disclosed coated pigment will now be described. Referring to FIG. 1, a coated pigment 10 includes a substrate 12. In one example, the substrate 12 can be an encapsulatable platelet. The size of the encapsulatable platelet 12 can have any size that is suitable for forming an effect pigment. In one implementation, the encapsulatable platelet 12 has a diameter in the range of 5 µm to 700 µm, and a thickness of 30 nm to 1000 nm. The diameter and thickness can be measured using, for example, Field Emission Scanning Electron Microscopy (FESEM). In this instance, the diameter is measured as viewed in cross-sectional top plan view of the platelet, and the thickness is measured as viewed in cross-sectional side view of the platelet.

In addition, the substrate 12 can be formed of any material that is suitable for forming an effect pigment, including, but not limited to, aluminum, silver, copper, gold, tin, tantalum, titanium, ruthenium, rhodium, platinum, palladium, alloys thereof, and combinations thereof. In one example, the substrate 12 is a reflective opaque metal substrate. In one instance, the reflective opaque metal substrate 12 is aluminum. In this instance, the substrate 12 provides reflective properties.

The substrate 12 is coated with a first layer 15. In one example, the first layer 15 is a near-IR reflective layer. In one example, the near-IR reflective layer 15 includes the disclosed $Mn_xV_yTa_zO_w$. In one example, the near-IR reflective layer 15 is applied as a film, and the thickness of the film of the near-IR reflective layer 15 is in a range from 0.1 nm to 1000 nm. Such thicknesses can be observed by an atomic force microscope (AFM).

The first layer 15 is further coated with a second layer 19. In one example, the second layer 19 is a chalcogenide glass layer. The chalcogenide glass layer 19 can include, but is not limited to, a high refractive index material. In one instance, the chalcogenide glass layer 19 includes a Ge-based black chalcogenide glass system, which includes, but is not limited to, GeSbSe, GeSe, GeSeTe, GeSeSn and GeSeSnTe. In one implementation, the chalcogenide glass layer 19 includes $Ge_{28}Sb_{12}Se_{60}$. In another instance, the chalcogenide glass layer 19 includes a Si-based black chalcogenide glass system, which includes, but is not limited to, SiSbSe and SiSe. In yet another instance, the chalcogenide glass layer 19 includes a Sn—Sb—Bi—Se-like glass system. In one example, the chalcogenide glass layer 19 is applied as a film, and the thickness of the film of the chalcogenide glass layer 19 is in a range from 400 nm to 2000 nm. In another example, the thickness of the film of the chalcogenide glass layer 19 is in a range from 500 nm to 1000 nm. In yet another example, the thickness of the film of the chalcogenide glass layer 19 is in a range from 600 nm to 800 nm. Such thicknesses also can be observed by an atomic force microscope (AFM).

The chalcogenide glass layer 19 has a refractive index, where the reflective opaque metal substrate 12 and the chalcogenide glass layer 19 form a black metallic pigment, such that when the coated pigment 10 is viewed at a right angle relative to the outer surface of the pigment, the coated pigment 10 appears metallic, and such that when the coated pigment 10 is viewed at angles other than a right angle relative to the outer surface of the pigment, the coated pigment 10 appears black. That is, the overall arrangement of the coated pigment 10 can give a metallic appearance (highly reflective) when viewed at right angles and can give a black appearance when viewed at an angle.

In some embodiments, regardless of the material that is used for the chalcogenide glass layer 19, the refractive index of the chalcogenide glass layer 19 is at least greater than 1.5 and about 2.6 in some instances. In one example, the refractive index is greater than 2.6. It will be appreciated that the high refractive index glass layer 14 can have a refractive index in the range of about 1.5 to 2.6.

In one instance, the substrate 12 is infrared reflective and the chalcogenide glass layer 19 is infrared transparent.

Examples of the chalcogenide glass layer 19 suitable for use with the coated pigment 10 is described in U.S. Provisional Application No. 61/302,788, titled "BLACK METALLIC PIGMENTS", and is hereby incorporated by reference.

In one implementation of the coated pigment 10, the coated pigment 10 does not include chromium. The term "chromium" herein means chromium having an oxidation state of −2 to +6, or any compound including chromium having an oxidation state of −2 to +6.

In one embodiment, the construction of the coated pigment 10 combines the reflective properties of the reflective opaque metal substrate 12 with the near-IR reflective properties of the first layer 15 that includes the disclosed $Mn_xV_yTa_zO_w$, while the outer layer of the chalcogenide glass layer 19 provides a black metallic effect. In one instance, the coated pigment 10 is black, reflective and lustrous, and exhibits near-IR reflection up to and in the region of 90% with an SR value of approximately 33%.

In one embodiment of the method for producing the coated pigment 10, the near-IR reflective layer 15 and the chalcogenide glass layer 19 are coated onto the reflective opaque metal substrate 12 by physical vapor deposition (PVD), which is known. For example, the coated pigment 10 can be manufactured by such processes as, but not limited to, thermal evaporation, E-beam, and sputter deposition. Such PVD deposition can provide a smooth pigment structure with uniform thickness, which can further provide a mirror-like effect. The pigment(s) herein can be manufactured, for example using PVD, to produce a pigment with a very, smooth surface texture, having a root mean square (RMS) roughness of the order of tens of nanometers. In one instance, the roughness is significantly less when compared to RMS roughness in cases showing at least 0.2 µm in irregularity. The RMS roughness can be less than 50 nm. In another example, the RMS roughness can be less than 30 nm. In yet another example, the RMS roughness can be less than 20 nm.

In one embodiment, the coated pigment 10 may be used in a coating composition. The coating composition includes the coated pigment 10 and a carrier. The "carrier" component includes the base liquid or solvent, film-forming components, and related additives. Carriers include, but are not limited to, the following: acrylic emulsions, water reducible alkyl resin systems, water reducible alkyl/melamine cross-linked systems, waterborne epoxy systems, polyester emulsions, and water reducible polyester/melamine coatings.

In one embodiment, the coated pigment 10 may used in a coating in an article. The article includes a coating that includes the coated pigment.

EXAMPLES

Example 1

Solid State Reaction Method for Producing the Disclosed Material 35.87 g of $MnO_2$, 18.68 g of $V_2O_5$ and 45.42 g of $TaO_5$ are mixed and ground together for 30 minutes in an automated grinder. The powder is transferred to an alumina crucible, which is placed in a furnace and heated (at a rate of 10° C./min) to 1000° C. for four hours. After this period, the crucible is cooled and the granular product is removed. The product is ground in an automated mortar and pestle before being fine ground in a bead mill. The resulting product is composed of two crystalline variants ("phases") of the disclosed material. The color of the resulting product is brown after milling. The resulting product exhibits an SR value of approximately 30%.

Example 2

Wet Route Method for Producing the Disclosed Material 3.96 g of $MnCl_2.4H_2O$ is dissolved in 4 mL of $H_2O$ by stirring to give a solution with a pH of 2.5. 1.16 g of $NH_4VO_3$ is dissolved in 16 mL of 1M NaOH solution by stirring. These solutions are added together to precipitate a brown precursor paste. 2.21 g of $Ta_2O_5$ is mixed into the Mn/V precursor paste and blended until homogenous in a mortar and pestle. The paste is transferred to an alumina crucible, which is placed in a furnace and heated (at a rate of 10° C./min) to 1000° C. for four hours. After this period, the crucible is cooled and the granular product is removed. The product is ground in an automated mortar and pestle before being fine ground in a bead mill. The resulting product is composed of two crystalline variants ("phases") of the disclosed material. The resulting product has a lighter color than that of the product of the solid state reaction and exhibits an SR value of approximately 40%.

Example 3

Melt Route for Producing the Disclosed Material 5.04 g of $MnO_2$, 4.09 g of $V_2O_5$ and 2.19 g of $Ta_2O_5$ are mixed and transferred to an alumina crucible, which is placed in a furnace and heated to 1400° C. at 300° C./hr. The melt is soaked for 15 minutes. After this period, the crucible is removed and the melt is quenched by pouring onto a metal plate. The product is ground in an automated mortar and pestle before being fine ground in a bead mill. The resulting product has a single phase throughout the process, and exhibits an SR value of 33%. The presence of only one phase affords a darker color and higher SR value that those of the product from the solid state route.

Example 4

Melt Route for Producing the Disclosed Material 5.04 g of $MnO_2$, 4.09 g of $V_2O_5$ and 2.19 g of $Ta_2O_5$ are mixed and transferred to a crucible, which is placed in a furnace and heated to 1400° C. at 300° C./hr. The melt is soaked for 5 minutes. After this period, the crucible is removed and the melt is quenched by pouring into cold water. The product is ground in an automated mortar and pestle before being fine ground in a bead mill. The resulting product has a single phase throughout the process, and exhibits an SR value of 33%.

Example 5

Melt Route for Producing the Disclosed Material 5.04 g of $MnO_2$, 4.09 g of $V_2O_5$ and 2.19 g of $Ta_2O_5$ are mixed and transferred to a crucible, which is placed in a furnace and heated to 1250° C. at 300° C./hr. The melt is soaked for 5 minutes. After this period, the crucible is removed and the melt is quenched by pouring onto a metal plate. The product is ground in an automated mortar and pestle before being fine ground in a bead mill. The resulting product has a single phase throughout the process, and exhibits an SR value of 35%.

Example 6

Melt Route for Producing the Disclosed Material 5.04 g of $MnO_2$, 4.09 g of $V_2O_5$ and 2.19 g of $Ta_2O_5$ are mixed and transferred to a crucible, which is placed in a furnace and heated to 1250° C. at 300° C./hr. The melt is soaked for 5 minutes. After this period, the crucible is removed and the melt is quenched by pouring into cold water. The product is ground in an automated mortar and pestle before being fine ground in a bead mill. The resulting product has a single phase throughout the process, and exhibits an SR value of 34%.

Example 7

Melt Route for Producing the Disclosed Material 5.04 g of $MnO_2$, 4.09 g of $V_2O_5$ and 2.19 g of $Ta_2O_5$ are mixed and transferred to a crucible, which is placed in a furnace and heated to 1100° C. at 300° C./hr. The melt is soaked for 5 minutes. After this period, the crucible is removed and the melt is quenched by pouring onto a metal plate or into a water bath. The product is ground in an automated mortar and pestle before being fine ground in a bead mill. The resulting product has a single phase throughout the process, and exhibits an SR value of 34%. The lower processing temperature reduces refractory corrosion and the product performance is less susceptible to quench rate.

Example 8

Preparation of Coated Pigment Including Chalcogenide Glass Layer and the Disclosed Material Commercially available bulk chalcogenide glasses including a Ge-based black chalcogenide glass system are used as a raw material to deposit a chalcogenide layer using the products obtained in Examples 1-7 as the substrate. The chalcogenide layer is deposited by thermal evaporation using a current of 75 A at about $5 \times 10^{-7}$ Torr at normal incidence (0°) and at two oblique angles (75° and 85°) with no substrate rotation. The thickness of the resulting chalcogenide layer is about 400 to 2000 nm. The produced coated pigment does not include chromium.

Example 9

L*, a*, b* and Solar Reflectance (SR) were measured for the following compositions: $Mn_2V_{1.8}Ta_{0.2}$, $Mn_2V_{1.8}Ta_{0.2}O_7$, $Mn_2V_{1.8}Ta_{0.2}O_7$, $Mn_2V_{1.8}Ta_{0.2}O_7$, $Mn_2VTaO_7$. The compositions were made via the solid state route as per Example 1.

L*, a*, b* and Solar Reflectance (SR) were measured using a Perkin Elmer UV/vis/NIR ATR Lambda 950 spectrophotometer fitted with an integrating sphere. The powders were held in a polymer-based sample support. L*, a* and b* values were measured in accordance with ASTM E308/CIE 1964 with simulated D65 light source at a theoretical two degree observed angle. SR values were measured in accordance with ASTM G173. L*, a* and b* are coordinates of the CIE colour map system in which L* represents differences between dark and light colours, and a* and b* represent the principal colour axes; negative a* represents green, positive a* represents red; yellow at positive b* and blue at negative b*. Solar reflectance (SR) is defined as the weighted average of percent reflectance of wavelengths from 250 nm to 2500 nm within the solar spectrum.

Figure 2:
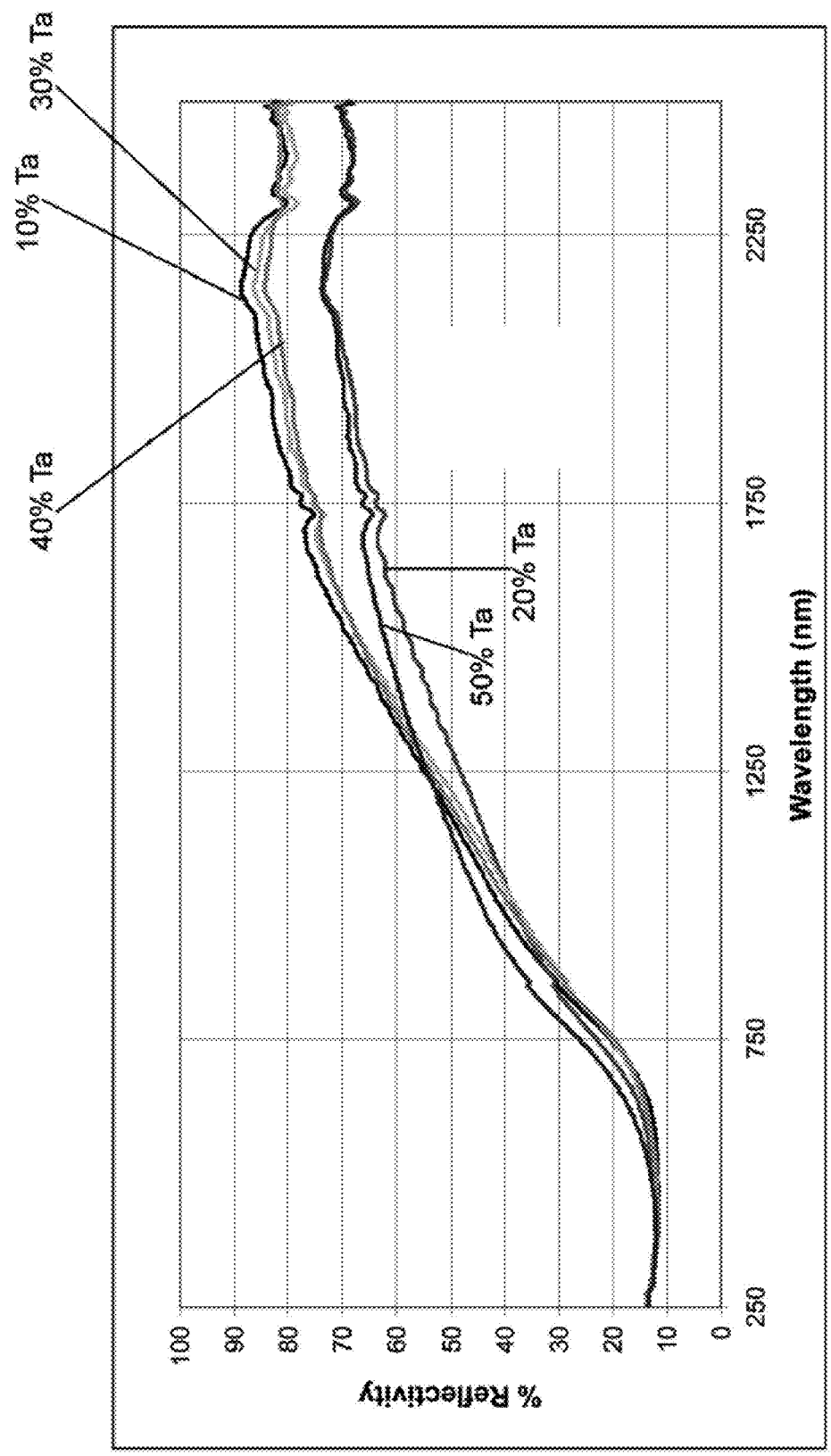
FIG. 2 shows comparative data of reflectivity for different compositions of manganese vanadium tantalum oxide prepared by a solid state process.

The results of the measured percent reflectance of wavelengths from 250 nm to 2500 nm for the above compositions are depicted in the graph of FIG. 2. The results of the measured percent reflectance of wavelengths from 250 nm to 2500 nm for $Mn_2VTaO_7$ are provided in the graph of FIG. 3. The results of the measured percent reflectance of wavelengths from 250 nm to 2500 nm for $Mn_2V_{1.6}Ta_{0.4}O_7$ are provided in the graph of FIG. 4. The measured L*, a*, b* and Solar Reflectance (SR) values for the above compositions are provided in Table 1 below.

TABLE 1

| Composition | L* | a* | b* | SR (%) |
|---|---|---|---|---|
| $Mn_2V_{1.8}Ta_{0.2}O_7$ | 43.32 | 6.51 | 6.65 | 33.2 |
| $Mn_2V_{1.6}Ta_{0.4}O_7$ | 42.34 | 4.06 | 4.10 | 31.2 |
| $Mn_2V_{1.4}Ta_{0.6}O_7$ | 44.06 | 4.19 | 4.77 | 29.4 |
| $Mn_2V_{1.2}Ta_{0.8}O_7$ | 45.29 | 4.38 | 5.43 | 31.9 |
| $Mn_2VTaO_7$ | 46.02 | 4.40 | 6.78 | 33.3 |

Figure 3:
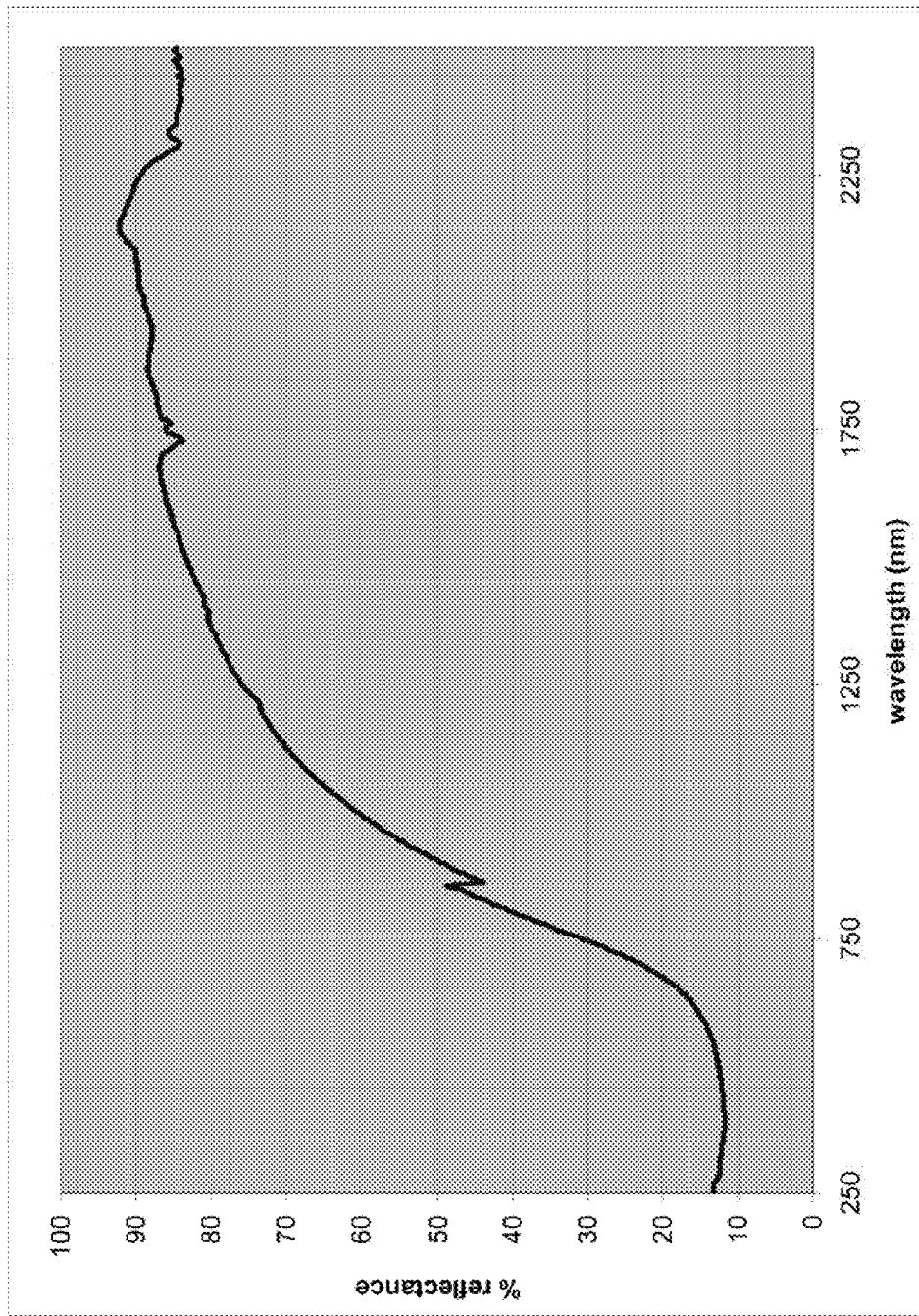
FIG. 3 shows a reflectance curve for manganese vanadium tantalum oxide with composition $Mn_2VTaO_7$ from optimised solid state process.
Figure 4:
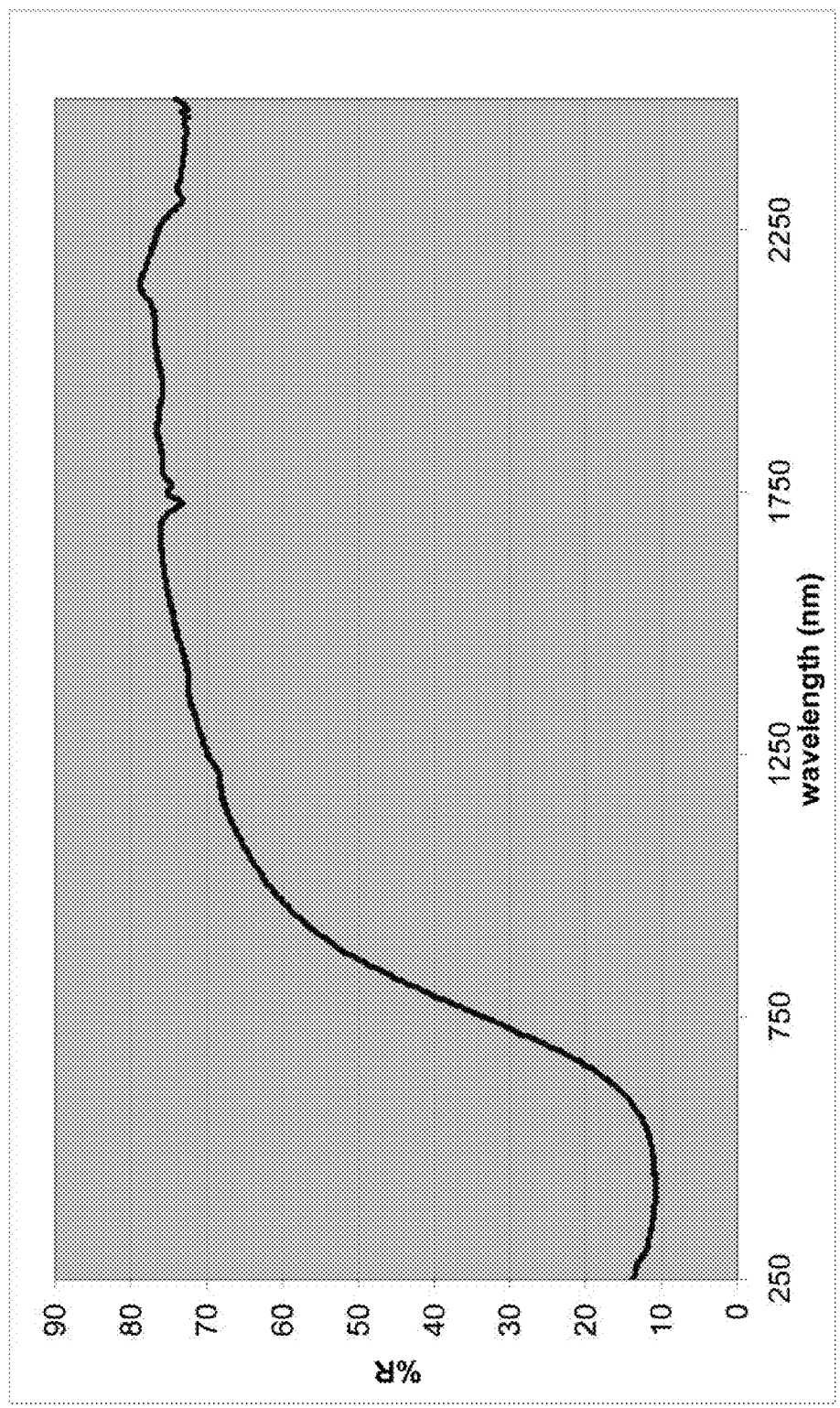
FIG. 4 shows a reflectance curve for manganese vanadium tantalum oxide with composition $Mn_2V_{1.6}Ta_{0.4}O_7$ prepared by a melt process.
Figure 5:
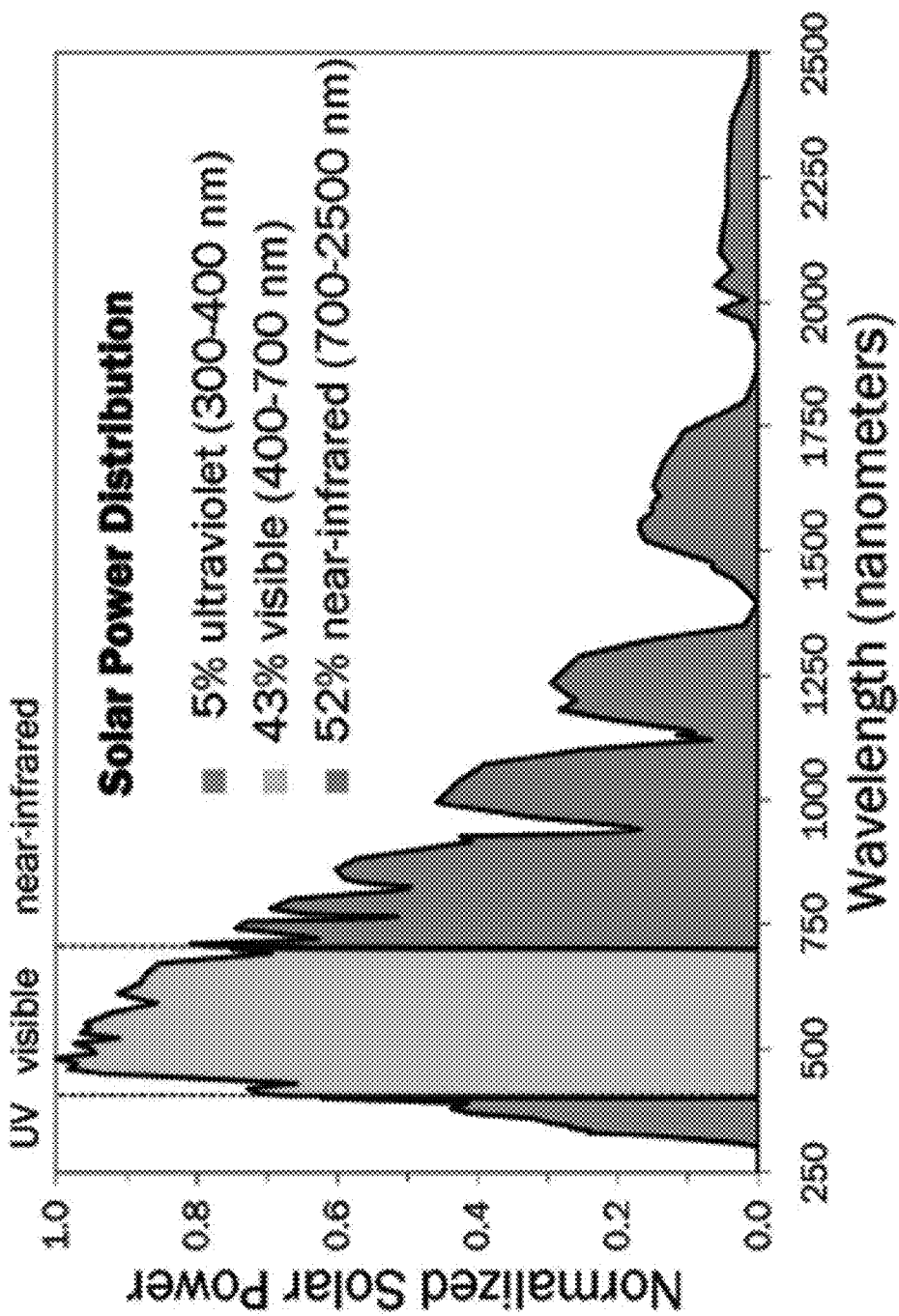
FIG. 5 depicts the solar power distribution in the ultraviolet, visible and near-IR wavelengths.

FIG. 5 shows the solar power distribution of ultraviolet wavelengths (300-400 nm), visible wavelengths (400-700 nm) and near-IR wavelengths (700-2500 nm). As is clear from FIG. 5, the intensity of the solar radiation changes with wavelength, and it is desirable that the black metallic effect pigment exhibits minimal reflection in the visible wavelengths and high reflection in the near-IR wavelengths. As shown in FIGS. 2-4, the compositions that were made via the solid state route as per Example 1 show minimal reflection in the visible wavelengths and high reflection in the near-IR wavelengths.

Example 10

L*, a*, b* and Solar Reflectance (SR) were measured for the composition $Mn_2VTaO_7$, using the methods described in Example 8. This composition was prepared via the wet route as per Example 2. The measured L*, a*, b* and Solar Reflectance (SR) values for the above composition is provided in Table 2 below.

TABLE 2

| Composition | L* | a* | b* | SR (%) |
|---|---|---|---|---|
| Mn2VTaO7 | 55.7 | 4.09 | 16.0 | 39.6 |

Example 11

L*, a*, b* and Solar Reflectance (SR) were measured for the following compositions: $Mn_2VTaO_7$, $Mn_{2.05}V_{1.19}Ta_{0.75}O_7$, $Mn_{2.05}V_{1.59}Ta_{0.35}O_7$, $Mn_{2.05}V_{0.79}Ta_{1.15}O_7$, $Mn_{2.45}V_{1.19}Ta_{0.35}O_7$, $Mn_{1.65}V_{1.19}Ta_{1.15}O_7$, $Mn_{2.45}V_{0.70}Ta_{0.75}O_7$, $Mn_{1.65}V_{1.59}Ta_{0.75}O_7$, $Mn_{1.65}V_{1.99}Ta_{0.35}O_7$, $Mn_{1.25}V_{1.99}Ta_{0.75}O_7$, and $Mn_{1.25}V_{2.39}Ta_{0.35}O_7$. L*, a*, b* and Solar Reflectance (SR) were measured using the methods described in Example 8. These compositions were prepared via the melt process as per Example 3, where the melt was heated to 1400° C. and quenched using a metal plate. The measured L*, a*, b* and Solar Reflectance (SR) values for the above composition is provided in Table 3 below.

TABLE 3

| Composition | L* | a* | b* | SR (%) |
|---|---|---|---|---|
| $Mn_2VTaO_7$ | 44.5 | 5.61 | 6.51 | 30.9 |
| $Mn_{2.05}V_{1.19}Ta_{0.75}O_7$ | 43.4 | 6.35 | 6.19 | 35.3 |
| $Mn_{2.05}V_{1.59}Ta_{0.35}O_7$ | 43.1 | 6.30 | 5.94 | 36.3 |
| $Mn_{2.05}V_{0.79}Ta_{1.15}O_7$ | N/D | | | 31.0 |
| $Mn_{2.45}V_{1.19}Ta_{0.35}O_7$ | 43.9 | 6.61 | 7.54 | 32.7 |
| $Mn_{1.65}V_{1.19}Ta_{1.15}O_7$ | 45.1 | 4.63 | 5.99 | 27.1 |
| $Mn_{2.45}V_{0.79}Ta_{0.75}O_7$ | 44.9 | 4.58 | 5.99 | 29.7 |
| $Mn_{1.65}V_{1.59}Ta_{0.75}O_7$ | 44.1 | 5.17 | 5.56 | 26.9 |
| $Mn_{1.65}V_{1.99}Ta_{0.35}O_7$ | 44.6 | 6.09 | 7.21 | 26.0 |
| $Mn_{1.25}V_{1.99}Ta_{0.75}O_7$ | 46.6 | 6.28 | 8.98 | 26.8 |
| $Mn_{1.25}V_{2.39}Ta_{0.35}O_7$ | 46.3 | 5.95 | 8.92 | 24.8 |

While the disclosed coated pigments and methods have been described in conjunction with a preferred embodiment, it will be apparent to one skilled in the art that other objects and refinements of the disclosed coated pigments and methods may be made within the purview and scope of the disclosure.

The disclosure, in its various aspects and disclosed forms, is well adapted to the attainment of the stated objects and advantages of others. The disclosed details are not to be taken as limitations on the claims.

What is claimed is:
1. A composition, comprising:
manganese vanadium tantalum oxide having the formula $Mn_xV_yTa_zO_w$, where $1 \leq x \leq 3$, $0.001 \leq y \leq 3$, $0.001 \leq z \leq 2$, and w=7.

2. The composition of claim 1, wherein the manganese vanadium tantalum oxide exhibits a Solar Reflectance (SR) of over 20%.

3. The composition of claim 2, wherein the manganese vanadium tantalum oxide exhibits a SR of about 33%.

4. The composition of claim 1, wherein the manganese vanadium tantalum oxide exhibits near-infrared reflectance of up to about 90%.

5. The composition of claim 1, wherein $1.25 \leq x \leq 2.45$, $0.1 \leq y \leq 2.39$ and $0.2 \leq z \leq 1.9$.

6. The composition of claim 1, further comprising a carrier, wherein the manganese vanadium tantalum oxide is dispersed in the carrier.

7. The composition of claim 1, wherein the carrier is at least one selected from the group consisting of acrylic emulsions, water reducible alkyl resin systems, water reducible alkyl/melamine cross-linked systems, waterborne epoxy systems and polyester emulsions.

8. The composition of claim 1, further comprising at least one selected from the group consisting of a Ge-based black chalcogenide glass system, an Si-based black chalcogenide glass system, and an Sn—Sb—Bi—Se-like glass system.

9. A method of producing manganese vanadium tantalum oxide, comprising:
(a) mixing powders of manganese oxide, vanadium oxide and tantalum oxide or precursors capable of forming manganese oxide, vanadium oxide and tantalum oxide; and
(b) heating the mixture to obtain the composition of claim 1.

10. The method of claim 9, wherein the mixture of (a) has an elemental ratio of Mn:V:Ta from about 20:19:1 to about 20:1:19.

11. The method of claim 9, wherein the powders of manganese oxide, vanadium oxide and tantalum oxide are $MnO_2$, $V_2O_5$ and $Ta_2O_5$, respectively, and the precursors include MnO, $NH_4VO_3$, $VCl_x$, and $NaVO_3$.

12. A method of producing manganese vanadium tantalum oxide, comprising:
(a) mixing an alkaline vanadium-containing solution and an acidic manganese-containing solution to precipitate a vanadium-manganese precursor paste;
(b) blending a tantalum source with the vanadium-manganese precursor paste; and
(c) heating the mixture of (b) to obtain the composition of claim 1.

13. The method of claim 12, wherein the mixture of (a) has an elemental ratio of Mn:V:Ta that is from about 20:19:1 to about 20:1:19.

14. A method of producing manganese vanadium tantalum oxide, comprising:
(a) mixing manganese oxide, vanadium oxide and tantalum oxide or precursors capable of forming manganese oxide, vanadium oxide and tantalum oxide;
(b) heating the mixture; and
(c) quenching the heated mixture to obtain the composition of claim 1.

15. The method of claim 14, wherein the mixture of (a) has an elemental ratio of Mn:V:Ta that is 2:1:1.

16. The method of claim 14, wherein the manganese oxide, vanadium oxide and tantalum oxide are $MnO_2$, $V_2O_5$ and $Ta_2O_5$, respectively, and the precursors include MnO, $NH_4VO_3$, $VCl_x$, and $NaVO_3$.

17. The method of claim 14, wherein the heated mixture is quenched onto a metal plate or into a water bath.

18. The method of claim 14, wherein the manganese oxide, vanadium oxide and tantalum oxide or the precursors capable of forming manganese oxide, vanadium oxide and tantalum oxide are powders, granules or pellets.

19. A coated pigment, comprising:
a substrate;
an infrared reflective layer that includes the composition of claim 1 coated on the substrate; and
a chalcogenide glass layer having a refractive index coated on the infrared reflective layer,
wherein the substrate, the infrared reflective layer and the chalcogenide glass layer form a black metallic pigment, such that when the coated pigment is viewed at a right angle relative to an outer surface of the pigment, the pigment appears metallic, and such that when the pigment is viewed at angles other than a right angle relative to the outer surface of the pigment, the pigment appears black.

20. The coated pigment of claim 19, wherein the coated pigment does not include chromium.

21. The coated pigment of claim 19, wherein the substrate is at least one metal selected from the group consisting of aluminum, silver, copper, gold, tin, tantalum, titanium, ruthenium, rhodium, platinum, palladium, alloys thereof, and combinations thereof.

22. The coated pigment of claim 19, wherein the chalcogenide glass layer is at least one selected from the group consisting of a Ge-based black chalcogenide glass system, an Si-based black chalcogenide glass system, and an Sn—Sb—Bi—Se-like glass system.

23. The coated pigment of claim 19, wherein the chalcogenide glass layer is $Ge_{28}Sb_{12}Se_{60}$.

24. The method of producing the coated pigment of claim 19, comprising:
coating the substrate with the chalcogenide glass layer and the infrared reflective layer by physical vapor deposition.

25. A coating composition, comprising:
the coated pigment of claim 19, and
a carrier.

26. An article, comprising:
a coating that comprises the coated pigment of claim 19.

* * * * *